(12) United States Patent
Joshi et al.

(10) Patent No.: US 7,793,329 B2
(45) Date of Patent: Sep. 7, 2010

(54) METHOD AND SYSTEM FOR REDUCING SWITCHING DELAYS BETWEEN DIGITAL VIDEO FEEDS USING MULTICAST SLOTTED TRANSMISSION TECHNIQUE

(75) Inventors: Vinay Joshi, Santa Clara, CA (US); Jayakumar Muthukumarasamy, Dublin, CA (US); Satish Menon, Sunnyvale, CA (US); Rajiv Malik, Sunnyvale, CA (US)

(73) Assignee: Kasenna, Inc., Sunnyvale, CA (US)

( * ) Notice: Subject to any disclaimer, the term of this patent is extended or adjusted under 35 U.S.C. 154(b) by 776 days.

(21) Appl. No.: 11/703,540

(22) Filed: Feb. 6, 2007

(65) Prior Publication Data
US 2007/0250890 A1    Oct. 25, 2007

Related U.S. Application Data

(60) Provisional application No. 60/771,088, filed on Feb. 6, 2006.

(51) Int. Cl.
*H04N 7/173* (2006.01)
*H04N 7/12* (2006.01)
*H04B 1/66* (2006.01)

(52) U.S. Cl. .................. 725/120; 725/91; 725/114; 725/115; 725/116; 375/240; 375/240.01

(58) Field of Classification Search ............ 725/91, 725/92, 93, 94, 10, 102, 103, 114, 115, 120, 725/101, 116; 375/240, 240.01
See application file for complete search history.

(56) References Cited

U.S. PATENT DOCUMENTS

| 1,868,601 | A | 7/1932 | Harris |
| 2,839,185 | A | 6/1958 | Isaacs |
| 4,161,075 | A | 7/1979 | Eubanks et al. |
| 4,258,843 | A | 3/1981 | Wymer |
| 4,437,618 | A | 3/1984 | Boyle |
| 5,202,961 | A | 4/1993 | Mills et al. |
| 5,247,676 | A | 9/1993 | Ozur et al. |
| 5,253,275 | A | 10/1993 | Yurt et al. |
| 5,263,165 | A | 11/1993 | Janis |

(Continued)

FOREIGN PATENT DOCUMENTS

JP    10-294493    11/1998

OTHER PUBLICATIONS

Ackermann, P., "Direct manipulation of temporal structures in a multimedia application framework", Proc. 2nd ACM Intl Conf on Multimedia. 1994 (pp. 51-58).

(Continued)

*Primary Examiner*—John W Miller
*Assistant Examiner*—John Schnurr
(74) *Attorney, Agent, or Firm*—Michael Haynes PLC; Michael N. Haynes

(57) ABSTRACT

Method and system for reducing switching delays between digital video feeds using multicast slotted transmission technique. Method, system, computer program stored on a computer readable medium for reducing switching delays between digital video feeds or different video or data channels using a slotted distribution and transmission technique. Method and system for performing a fast channel change operation. A computer propagated data signal. An article of manufacture comprising a digital video signal set.

15 Claims, 5 Drawing Sheets

Client Server Interaction

U.S. PATENT DOCUMENTS

| | | |
|---|---|---|
| 5,263,625 A | 11/1993 | Yasrebi |
| 5,267,351 A | 11/1993 | Reber et al. |
| 5,276,861 A | 1/1994 | Howarth |
| 5,276,876 A | 1/1994 | Coleman et al. |
| 5,317,568 A | 5/1994 | Bixby et al. |
| 5,325,297 A | 6/1994 | Bird et al. |
| 5,341,477 A | 8/1994 | Pitkin et al. |
| 5,369,570 A | 11/1994 | Parad |
| 5,388,264 A | 2/1995 | Tobias, II et al. |
| 5,390,138 A | 2/1995 | Milne et al. |
| 5,392,432 A | 2/1995 | Engelstad et al. |
| 5,414,455 A | 5/1995 | Hooper et al. |
| 5,430,876 A | 7/1995 | Schreiber et al. |
| 5,434,678 A | 7/1995 | Abecassis |
| 5,442,390 A | 8/1995 | Hooper et al. |
| 5,442,791 A | 8/1995 | Wrabetz et al. |
| 5,446,901 A | 8/1995 | Owicki et al. |
| 5,455,932 A | 10/1995 | Major et al. |
| 5,459,871 A | 10/1995 | Van Den Berg |
| 5,461,611 A | 10/1995 | Drake, Jr. et al. |
| 5,467,288 A | 11/1995 | Fasciano et al. |
| 5,475,819 A | 12/1995 | Miller et al. |
| 5,485,611 A | 1/1996 | Astle |
| 5,485,613 A | 1/1996 | Engelstad et al. |
| 5,491,797 A | 2/1996 | Thompson et al. |
| 5,491,800 A | 2/1996 | Goldsmith et al. |
| 5,515,490 A | 5/1996 | Buchanan et al. |
| 5,519,863 A | 5/1996 | Allen et al. |
| 5,537,528 A | 7/1996 | Takahashi et al. |
| 5,548,723 A | 8/1996 | Pettus |
| 5,550,965 A | 8/1996 | Gabbe et al. |
| 5,553,221 A | 9/1996 | Reimer et al. |
| 5,557,785 A | 9/1996 | Lacquit et al. |
| 5,559,608 A | 9/1996 | Kunihiro |
| 5,559,949 A | 9/1996 | Reimer et al. |
| 5,559,955 A | 9/1996 | Dev et al. |
| 5,561,769 A | 10/1996 | Kumar et al. |
| 5,568,181 A | 10/1996 | Greenwood et al. |
| 5,581,703 A | 12/1996 | Baugher et al. |
| 5,584,006 A | 12/1996 | Reber et al. |
| 5,586,264 A | 12/1996 | Belknap et al. |
| 5,596,720 A | 1/1997 | Hamada et al. |
| 5,602,582 A | 2/1997 | Wanderscheid et al. |
| 5,603,058 A | 2/1997 | Belknap et al. |
| 5,623,699 A | 4/1997 | Blakeslee |
| 5,630,067 A | 5/1997 | Kindell et al. |
| 5,630,121 A | 5/1997 | Braden-Harder et al. |
| 5,633,999 A | 5/1997 | Clowes et al. |
| 5,640,388 A | 6/1997 | Woodhead et al. |
| 5,644,715 A | 7/1997 | Baugher |
| 5,682,597 A | 10/1997 | Ganek et al. |
| 5,694,548 A | 12/1997 | Baugher et al. |
| 5,701,465 A | 12/1997 | Baugher et al. |
| 5,712,976 A | 1/1998 | Falcon, Jr. et al. |
| 5,724,605 A | 3/1998 | Wissner |
| 5,737,747 A | 4/1998 | Vishlitzky et al. |
| 5,751,280 A | 5/1998 | Abbott et al. |
| 5,758,078 A | 5/1998 | Kurita et al. |
| 5,778,181 A | 7/1998 | Hidary et al. |
| 5,790,795 A | 8/1998 | Hough |
| 5,801,781 A | 9/1998 | Hiroshima et al. |
| 5,805,821 A | 9/1998 | Saxena et al. |
| 5,819,019 A | 10/1998 | Nelson |
| 5,877,812 A | 3/1999 | Krause et al. |
| 5,892,767 A | 4/1999 | Bell et al. |
| 5,892,913 A | 4/1999 | Adiga et al. |
| 5,920,700 A | 7/1999 | Gordon et al. |
| 5,925,104 A | 7/1999 | Elbers et al. |
| 5,926,649 A | 7/1999 | Ma et al. |
| 5,928,330 A | 7/1999 | Goetz et al. |
| 5,930,797 A | 7/1999 | Hill |
| 5,933,849 A | 8/1999 | Srbljic et al. |
| 5,953,506 A | 9/1999 | Kalra et al. |
| 5,973,679 A | 10/1999 | Abbott et al. |
| 5,996,025 A | 11/1999 | Day et al. |
| 6,006,264 A | 12/1999 | Colby et al. |
| 6,014,694 A | 1/2000 | Aharoni et al. |
| 6,018,619 A | 1/2000 | Allard et al. |
| 6,026,425 A | 2/2000 | Suguri et al. |
| 6,031,960 A | 2/2000 | Lane |
| 6,034,746 A | 3/2000 | Desai et al. |
| 6,094,706 A | 7/2000 | Factor et al. |
| 6,119,167 A | 9/2000 | Boyle et al. |
| 6,131,095 A | 10/2000 | Low et al. |
| 6,134,315 A | 10/2000 | Galvin |
| 6,137,834 A | 10/2000 | Wine et al. |
| 6,154,778 A | 11/2000 | Koistinen et al. |
| 6,185,625 B1 | 2/2001 | Tso et al. |
| 6,223,210 B1 | 4/2001 | Hickey |
| 6,230,200 B1 | 5/2001 | Forecast et al. |
| 6,240,243 B1 | 5/2001 | Chen et al. |
| 6,279,040 B1 | 8/2001 | Ma et al. |
| 6,281,524 B1 | 8/2001 | Yamamoto et al. |
| 6,343,298 B1 | 1/2002 | Savchenko et al. |
| 6,356,921 B1 | 3/2002 | Kumar et al. |
| 6,377,996 B1 | 4/2002 | Lumelsky et al. |
| 6,553,413 B1 | 4/2003 | Leighton et al. |
| 6,567,409 B1 | 5/2003 | Tozaki et al. |
| 6,584,463 B2 | 6/2003 | Morita et al. |
| 6,601,136 B2 | 7/2003 | Gunaseelan et al. |
| 6,654,933 B1 | 11/2003 | Abbott et al. |
| 6,661,430 B1 | 12/2003 | Brewer et al. |
| 6,708,213 B1 | 3/2004 | Bommaiah et al. |
| 6,717,591 B1 | 4/2004 | Fiveash et al. |
| 6,728,270 B1 | 4/2004 | Meggers et al. |
| 6,754,443 B2 | 6/2004 | Nelson et al. |
| 6,757,736 B1 | 6/2004 | Hutchison et al. |
| 6,771,644 B1 | 8/2004 | Brassil et al. |
| 6,831,394 B2 | 12/2004 | Baumgartner et al. |
| 6,868,452 B1 | 3/2005 | Eager et al. |
| 7,107,606 B2 | 9/2006 | Lee |
| 7,125,383 B2 | 10/2006 | Hoctor et al. |
| 2002/0010798 A1 | 1/2002 | Ben-Shaul et al. |
| 2002/0038374 A1 | 3/2002 | Gupta et al. |
| 2002/0040403 A1 | 4/2002 | Goldhor et al. |
| 2002/0049846 A1 | 4/2002 | Horen et al. |
| 2002/0065925 A1 | 5/2002 | Kenyon et al. |
| 2002/0078203 A1 | 6/2002 | Greschler et al. |
| 2002/0103928 A1 | 8/2002 | Singal et al. |
| 2002/0152318 A1 | 10/2002 | Menon et al. |
| 2002/0161868 A1 | 10/2002 | Paul et al. |
| 2003/0018978 A1 | 1/2003 | Singal et al. |
| 2003/0187811 A1 | 10/2003 | Chang et al. |
| 2005/0172314 A1* | 8/2005 | Krakora et al. ............... 725/38 |
| 2007/0039028 A1* | 2/2007 | Bar ........................... 725/95 |
| 2007/0121629 A1* | 5/2007 | Cuijpers et al. ............. 370/390 |

OTHER PUBLICATIONS

AVID "Edge clusters: now serving a dynamic internet" www.avid.com.

AVINTi: iSolation server FAQ http://www.avinti.com/downloads/isolation-server-faq.html.

AVINTi: iSolation server v. 2 whitepaper http://www.avinti.com/downloads/isolation-server-whitepaper.html.

Bommaiah et al., "Design and implementation of a caching system for streaming media over the internet" Proc Real-Time Technology & Applications Symposium 2000 (pp. 111-121).

Brumley, D. et al. "Remote timing attacks are practical" Proc 12th Usenix Security Symposium, 2003.

Bulterman et al., "A Structure for Transportable, Dynamic Multimedia Documents", USENIX Summer '91, Jun. 1991, pp. 137-155.

Byrne, K. "Evaluating jukebox performance" *The Practical Engineer* )IEEE Spectrum Jul. 1997.

Chandra, R. et al. "The collective: a cache-based system management architecture" (2nd Symp.on Networked Sys. Design & Implementation (May 2005), Boston MA.

Chow, J. et al. "Understanding data lifetime via whole system simulation" Proc 2004 Usenix Security Symposium.

Crutcher et al., "The networked video jukebox" IEEE Transactions on Circuits & Systems for Video Tech. vol. 4 No. 2, Apr. 1994.

Eitel, P. "Backup and storage management in distributed heterogeneous environments" 13th IEEE Symp. on Mass Storage Systems (1994) pp. 124-125.

Elrad, T. et al. "Developing secure applications through aspect-oriented programming" Addison-Wesley (Sample chapter from *Aspect Oriented Software Development* Nov. 2004.

Fan, et al, Sumary cache: a scalable wide-area web cache sharing protocol Technical Report 1361, Dept Computer Science, Univ Wisconsin-Madison, Feb. 1998.

Ford, D. et al. "Redundant arrays of independent libraries (RAIL): a tertiary storage system" 1996 IEEE Proc. of COMPCON '96 (pp. 280-285).

Garfinkel, T. et al. "Flexible OS support and appliations for trusted computing". Stanford Univ. Dept of Computer Science http://suif.stanford.edu/papers/trusted-hotos03.pdf.

Garfinkel, T. Ostia: a delegating architecture for secure system call interposition Stanford Univ. Dept. of Computer Science http://www.stanford.edu/~blp/papers/ostia.pdf.

Garfinkel, T. "Traps and pitfalls: practical problems in system call interposition based security tools" Stanford Univ. Dept of Computer Science http://www.stanford.edu/~talg/papers/traps/traps-ndss03.pdf.

Garfinkel, T. "Terra: a virtual machine-based platform for trusted computing" Stanford Univ. Dept. of Computer Science http://suif.stanford.edu/papers/sosp03-terra.pdf.

Garfinkel, T. "A virtual machine introspection based architecture for intrusion detection" Stanford Univ. Dept. of Computer Science http://suif.stanford.edu/papers/vmi-ndss03.pdf.

GreenBorder: About Us. http://www.greenborder.com/about/ (Jan. 2006).

GreenBorder offers security 'barrier' for IE, Outlook (Computerworld) Mar. 2005.

Grizzard, J. et al. "Towards an approach for automatically repairing compromised network systems"; Network Computing and Applications, 2004. (NCA 2004). Proceedings. Third IEEE International Symposium (Aug.-Sep. 1, 2004) pp. 389-382.

Gruber et al., "Protocol considerations for a prefix-caching proxy for multimedia streams" Computer Networks 33, pp. 657-668 (2000).

Hamakawa, R. et al. "Object composition and playback models for handling multimedia data" Springer-Verlag New York, Inc. (1994).

Hirzalla, N. et al. "A temporal model for interactive multimedia scenarios", IEEE MultiMedia, 1995 (pp. 24-31).

Jun, S. et al. "Video allocation methods in a multi-level server for large-scale VOD services" 1998 IEEE.

Little, "Interval-based conceptual models for time-dependent multimedia data", IEEE Transactions on Knowledge and Data Engineering, 5(4): 551-563 (1993).

Li, N. et al. "Oblivious signature-based envelope" *Proceedings of the 22nd ACM Symposium on Principles of Distributed Computing (PODC 2003)*, Boston, Massachusetts, Jul. 2003.

Ludescher, C. et al. "File storage management for TFTR physics data" 1992 IEEE (pp. 856-859).

Microsoft TechNet "Server and domain isolation using IPsec and group policy" (Mar. 2005).

Nahrstedt, K., "The qos broker" IEEE Multimedia, Spring 1995.

nCube: N4 Streaming Media System http://www.ncube.com (Nov. 2000).

Nelson et al., MediaBase: Streaming Media Serving for the Web, pp. 1-28 (1997).

Nelson et al. "A highly available, scalable ITV system" Assoc. for Comp. Mach. (ACM) 1995.

Oracle9i Real application clusters:cache fusion delivers scalability. Oracle White Paper (May 2001).

Pratt et al. "Arsenic: a user-accessible gigabit ethernet interface". Proc. IEEE Infocom (2001).

Rajae et al., "Multimedia proxy caching mechanism for quality adaptive streaming applications in the internet" IEEE Infocom 2000 (pp. 980-989).

RealNetworks Documentation Library. http://service.real.com/help.library/earlier.html (Dec. 2004).

RealNetworks, "RealServer Administration Guide," Dec. 13, 1999, http://service.real.com/help/library/guides/g270/realsvr.htm, Ch. 13, 14.

RealNetworks, "RealSystem 8.0x and earlier Production &Authoring Guides." http://service.real.com/help/library/earlier.htm.

RealNetworks, "RealSystem G2 Productio Guide," Mar. 22, 2000, http://service.real.com/help/library/guides/productiong27/realpgd.htm, Ch. 3,7.

Rexford, J. "A smoothing proxy service for variable bit-rate streaming video". Global Telecommunications Conf.-Globecom'99 (pp. 1823-1829) Sapuntzakis, C. et al.

Rothermel, K. "QoS negotiation and resource reservations for distributed multimedia applications" Proc IEEE Intl Conf on Multimedia Computing & Systems Jun. 1997 (pp. 319-26).

Ruwase, O. "A practical dynamic buffer overflow detector". Stanford Univ. 2004.

Sapuntzakis, C. et al., "Optimizing the migration of virtual computers" Stanford Univ (also, Proc 5th Op Sys Design and Implementation, Boston, MA, Dec. 2002).

Sapuntzakis, C. et al.,"Virtual appliances for deploying and maintaining software" Stanford Univ. Computer Systems Lab. 2003.

Schmidt, B. "Supporting ubiquitous computing with stateless consoles and computation caches". Stanford University Aug. 2000.

Schmidt, B. et al. "The interactive performance fo SLIM: a stateless, thin-client architecture" Op. Syst. Rev. 34(5):32-47, Dec. 1999.

SeaChange Media Cluster "New paradigm for digital video storage and delivery" whitepaper. Aug. 2002. www.seachangeinternational.com/downloads/broadcast/mediacluster/mediacluster%.

Sen, S. "Proxy prefix caching for multimedia streams" IEEE 1999.

Shenchang, E. "An image-basead approach to virtual environment navigation" Proc. SIGGRAPH 95 (pp. 29-38) 1995.

Stanford Collective Group: A virtual appliance computing infrastructure. Jan 2006. http://suif.stanford.edu/collective/index.html.

StreamWorks Server, May 8, 1997.

WebTheater 2 Product Datasheet, 1997.

WebForce Media Server, Aug. 15, 1996.

WebForce MediaBase—Mediabase 2.0 Brochure, 1997.

Wessels, D. et al., Internet Cache Protocol (ICP), v.2, Sep. 1997.

Yoshida, J., "MIPS Magic Carpet Takes Set-Top-Box Ride", EE Times, May 1995.

Zhang, et al., "RSVP: a new resource reservation protocol", IEEE Network, vol. 7, No. 5, pp. 8-18, (Sep. 1993).

Zeichik, Isolation and protection: Intel's lagrande vision for trusted virtualization, Nov. 2005. http://222.devx.com/Intel/Article/30008.

* cited by examiner

DSLAM Interconnection Network

METHOD AND SYSTEM FOR REDUCING SWITCHING DELAYS BETWEEN DIGITAL VIDEO FEEDS USING MULTICAST SLOTTED TRANSMISSION TECHNIQUE

CROSS REFERENCE TO RELATED APPLICATIONS

This application claims priority to U.S. Provisional Application No. 60/771,088 filed Feb. 6, 2006; which application is hereby incorporated by reference.

FIELD OF INVENTION

This invention pertains generally to systems and methods for reducing switching delays between digital video feeds, and more particularly to methods and systems for switching between multicast digital video feeds for various media content types including program content changes and advertisement insertion without viewer perceptible switching glitches or blank screens.

BACKGROUND OF INVENTION

Digital video or other digital image or content applications (such as, but not limited to digital television (DTV) broadcasts, music broadcast, digital movie production, video advertisements, multi-person video conferencing) all use compressed digital video at its core. For example, compression technologies such as ITU-standard Motion Picture Experts Group (MPEG) or Microsoft's VC-1, or Apple's QuickTime are some of the basis of majority of the schemes in use today. Most of these technologies use compression schemes where not all the frame's contain full-pictures that can be decoded stand-alone. Some frames (for example, two frames out of thirty frames, in the case of a common MPEG-2 specification) contain full pictures whereas other frames merely contain "differential" data—for example, information changes between complete pictures. This is how compression efficiency is typically achieved.

However, these types of encodings introduce some significant issues in certain common use cases. For example, consider the act of switching TV channels on a digital television network. In the case of analog television systems, this switching would be instantaneous. However, in the digital counterpart, depending on the instance in time, the new channel the user switches into may not have a complete frame for the client (the television set-top box) to start decoding the frame—the data might be differential in nature and without a base reference (a complete frame of data), the decoder is unable to decode the data stream, until a complete frame of data arrives. Depending on how the picture is encoded, the next complete frame of data may arrive in a few milliseconds or in few seconds. Additional delays are introduced in the various processing that happens within the network—for example, tuning to a channel in a digital Internet Protocol network (IP network) incurs what is called network multicast join (Internet Gateway Multicast Protocol ("IGMP") join") delays. Cumulatively, all of these delays add up and in certain situations become unacceptable—the user experiences a long delay in going from one channel to another.

In order to achieve higher compression efficiencies for video broadcasts, certain compression schemes and specifications allow for "stand-alone frames" (sometimes referred to key frames, as I-frames for Intra Coded frames, or as RAPs for Random Access Points) to be spaced out farther apart in time and from which a complete image may be generated without prediction or interpolation of other frames. All other frames are predicted using forward prediction (called P-frames where the "P denotes prediction) or bidirectional prediction (called B-frames where the "B" denotes bi-direction). In these schemes, specifications, and techniques, the predication is the key to achieving better compression: however, the resultant frames cannot be decoded independently. For example, the H.264 video codec used in MPEG-4 Part 10 implementation (See for example, the MPEG-4 ISO/IEC 14496 specification which is hereby incorporated by reference) allows I-frames or Random Access points to be spaced out as far as 2 to 8 seconds apart. The resultant digital video is "efficient" in terms of the amount or number of bits used to represent the scenes. However, channel change latency becomes significantly longer as it takes decoder a larger amount of time (longer time period) to get a standalone picture that does not require any frames from the past or future to start decoding. The resultant system becomes unacceptable in terms of user experience.

There are a few conventional approaches attempted to solve this Problem, but these approaches have not been entirely successful. In particular they have not been successful either for reducing the switching delays associated with changes in content fee selection for regular programming, nor for the switching requirements for desired insertion of local, customized, or other advertisements or other content into the digital television stream.

The first and simplest of these conventional approaches has been to digitally encode the video with standalone frames (I-frames or RAPs) that are spaced closer. For example, in the MPEG-2 specification used in DVB standards, the I-frames are spaced out 500 millisecond (msec) each. Thus, when a decoder starts receiving data upon a new channel selection, the worst case latency to begin decoding the stream is 500 msec plus the rest of the overhead (e.g. IGMP join). The rest of the overhead may for example consist of delays in recognizing the remote control key press and the time it takes to issue an IGMP join and be as long as a few microseconds to several milliseconds. However, as mentioned before, this conventional scheme does not yield the most efficient streams in terms of the amount of data used to represent the scenes. For example, for a standard definition video signal, this scheme may yield a compression efficiency that produces a digital bit-stream between 2.5 to 4.5 megabits/second.

One strategy to overcome the latency is to decode the stream and re-encode the stream such that when a client joins a channel, the data always starts with a standalone frame. This scheme requires significant server processor resources, such as central processing unit (CPU) resources, for decoding and re-encoding and introduces significant bandwidth overhead because more I-frames are generated and have to be transmitted (for example, the resultant data rate may go up from 50% to 100% or more of the compared to the original data stream) Another disadvantage of this scheme is that it is not compatible with features such as encryption because decoding requires access to encryption keys and re-encoding requires access to the original encryption scheme. Both of these are impractical and introduces significant security issues.

An alternate strategy is a hybrid solution, where a client that is interested in joining a new channel starts with a unicast stream first to reduce the latency of the channel change and then switches to a multicast stream at an appropriate point in the future. A unicast stream or model is a unique stream that is allocated for each individual user, compared to a multicast stream that is the same stream that a number of subscribers to that channel join. The unicast stream will need to start with a complete I-frame or RAP so that the client can start decoding the video data without any delay. However, a unicast stream model requires a lot of server and network resources and is not very cost effective. For example, in a very large network, each user will have to be assigned his/her own unique bandwidth.

However, for this conventional attempted hybrid solution to work well, the client needs to buffer enough data so that the transition from unicast to multicast can take place without any artifacts. Artifacts such as jitter, frozen frame, or black screen may typically result from transitioning at a non-RAP boundary or from lack of data. Client buffer requirements may vary depending, for example on bit-rate of the content, distance between two RAPs, or other factors. This implies that the unicast stream would need to be sent faster than the bitrate of the channel to build up the buffer on the client. The burden of a switch from the unicast stream to the multicast stream would be on the client rather than on the server. This would require a smart client whereas it is preferred to only require a thin or less intelligent client. Moreover, the data viewed by any client will always be delayed and the maximum delay would roughly equal the time between two RAPs.

Therefore in these conventional attempts to solve this problem have not been entirely successful, and/or impose additional undesired requirements on the client, so that new methods, system, and devices are needed to overcome the limitations in the prior-art.

SUMMARY

In one aspect, embodiments of the invention provides method, system, computer program and computer program product stored on a computer readable medium for reducing switching delays between digital video feeds or different video or data channels using a slotted distribution and transmission technique. In another aspect, embodiments of the invention provides an article of manufacture and a digital television signal optionally embodied by a signal carrier wave.

In another aspect, embodiments of the invention provide a method for performing a fast channel change operation comprising: receiving an input data stream; performing a data stream channel switching operation from a first data stream to a second data stream; generating a plurality of output data streams, each of the output data streams having a substantially identical data but having a timing of the data in each of the output data streams that have a time shift relative to each of the other output data streams; and communicating the plurality of output data streams to a client device over a first communication link.

In still another aspect, embodiments of the invention provide a system for performing a fast channel change operation comprising: means for receiving an input data stream; means for performing a data stream channel switching operation from a first data stream to a second data stream; means for generating a plurality of output data streams, each of the output data streams having a substantially identical data but having a timing of the data in each of the output data streams that have a time shift relative to each of the other output data streams; and means for communicating the plurality of output data streams to a client device over a first communication link.

In still another aspect, embodiments of the invention provide a method of changing a data stream from a first data stream to a second data stream, the first data stream being received on a first channel and the second data stream being received on a second channel, the method comprising the steps on the receipt of each channel change request, of: (1) determining the multicast it needs to join to experience the best latency for channel change, and generating a Join request which is sent to a channel server; (2) for the new join request received from the Channel Server, querying a buffer list storing metadata related to the data stream; (3) determining the nearest existing multicast group (referred as nMG) for the channel that satisfies or comes the closest to satisfying predetermined goals or conditions; (4) receiving the identity of the nearest existing multicast group (nMG); and (5) the client joining the nearest existing multicast group (nMG).

In yet another aspect, embodiments of the invention provide a method for switching between a plurality of broadcast groups, the method comprising: on identifying a channel change request, the server finding the nearest RAP (nRAP); the server finding the nearest PCR (nPCR); the server finding the nearest sequence parameter set (nSPS); determining whether Dist(nRAP, nSPS)>Dist(nRAP, nPCR); if Dist(nRAP, nSPS)>Dist(nRAP, nPCR) is valid or true, then the server finding the nearest PSI (nPSI) from nSPS; and if Dist(nRAP, nSPS)>Dist(nRAP, nPCR) is not valid or false, then the server finding the nearest PSI (nPSI) from nPCR; and the server then finding the nearest cast group (nMG) to nPSI which will contain nPSI in a time greater than Tmjd.

In still another aspect, embodiments of the invention provide a method for reducing switching delays between digital video feeds comprising: using slotted transmission techniques for switching between at least two video streams.

In even another aspect, embodiments of the invention provide a server system that reduces switching delays between digital video feeds comprising: a switch implementing a slotted transmission logic for switching between at least two video streams.

In still another aspect, embodiments of the invention provide a computer propagated data signal, comprising: a first code segment including a first broadcast group; and a second code segment including a second cast group that is the nearest cast group to the first broadcast group.

In yet another aspect, embodiments of the invention provide an article of manufacture comprising a digital video signal, the digital video signal including: a first digital video signal content portion, a second digital video signal content portion, and a third digital video signal content portion; a first transition portion between the first digital video signal content portion and the second digital video signal content portion being substantially free of artifacts; and a second transition portion between the second digital video signal content portion and the third digital video signal content portion being substantially free of artifacts.

In even another aspect, embodiments of the invention provide an apparatus comprising: a network input interface for receiving an input data stream; an interconnect logic circuit for interconnecting or switching the input data stream with or to selected line card inputs; a processor coupled with a memory and with the interconnect logic for executing program instructions; and the processor including means for generating control instructions for generating a plurality of temporally modified data streams from the received input data stream, each of the plurality of temporally modified data streams having a substantially identical data content to the received data stream but having a different time delay relative to it.

In yet another aspect, embodiments of the invention provide a computer program stored on a computer readable media including executable computer program instructions for executing in a processor logic for performing the methods of the invention.

DETAILED DESCRIPTION OF EXEMPLARY EMBODIMENTS OF THE INVENTION

Figure 1:
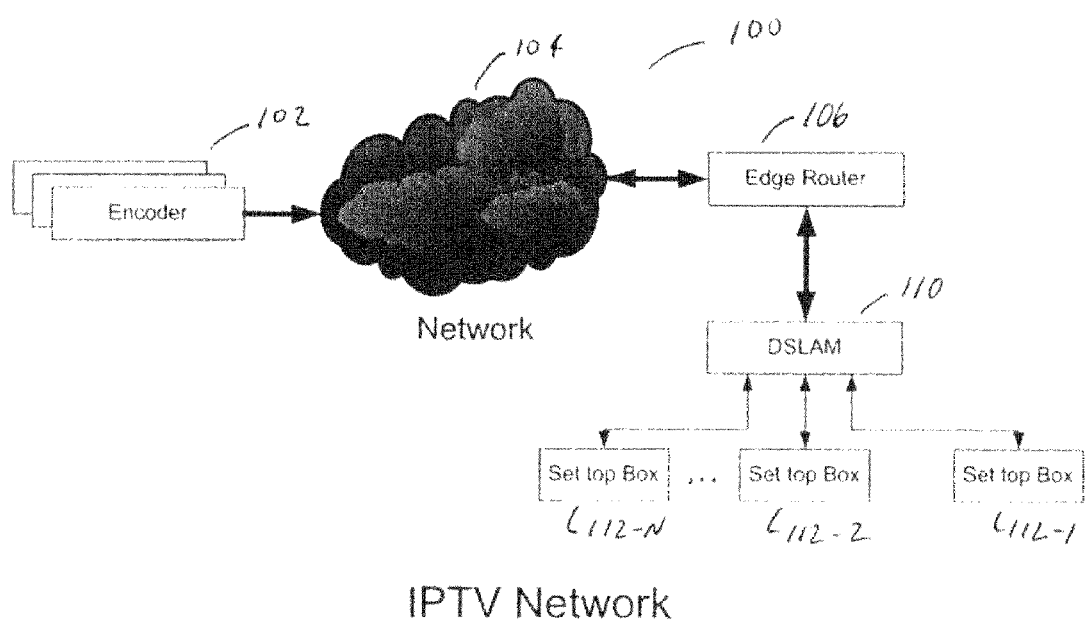
FIG. 1 is a diagrammatic illustration showing aspects of an embodiment of a IPTV Network according to the invention.

The invention provides systems, devices, methods, procedures, and computer programs and computer program products stored on computer readable media associated with a channel change request in an interaction between a server, providing video, and a client. These systems, devices, methods, procedures, and computer programs and computer program products reduce the switching delays between digital video or other media content feeds using what may be referred to as multicast slotted transmission techniques, procedures, and algorithms. The phrase slotted transmission is applied here because this approach uses controlled repeated multicast transmission of the video or other media content to reduce the video stream switch delays. These video stream switching delays may alternatively be referred to as channel changing or channel switching delays, The problems and limitations in the conventional arts, and/or the path to a solution to these problems and limitations may be abstracted as follows: it should be possible (and indeed as found to be possible) to switch between two different video streams (for example, streams that have different content and/or are encoded differently) such that the switching can occur near instantaneously. Nearly instantaneously in this context means, for example, that the change or switching occurs within a configured/specified bound or limit. Therefore, it is possible to predict the maximum channel switching delay. The maximum channel switching delay is equal to the interval between the multicast repeat transmissions and the delay introduced by the client to issue a request to leave the current channel and join the selected stream. In the examples below we choose an exemplary interval of 500 msec (as repeat interval), hence the maximum channel switching delay would be 500 msec (assuming for the purpose of this description, but not as a limitation of the invention, negligible delay on the client side to issue a request to leave the current channel and join the selected stream).

Once a solution for this problem can be found a number of market requirements (some of which are listed below) can be satisfied.

The various embodiments of the invention as described herein provide solutions to the afore described conventional system and method problems and limitations, and this inventive solution may be applied to a number of varied and different technology and market segment requirements. Some of the features and aspects of the invention as they apply to various technology and market segment requirements and features are described below by way of example, but not by way of limitation:

In a first aspect, embodiments of the invention may provide a near-instantaneous changing of channels on a digital television system or other video or media content delivery system.

In a second aspect, embodiments of the invention may provide for fast switching or changing between a broadcast video stream and an on-demand video or media stream, or between any other two or a multiplicity of different streams.

Embodiments of the invention may also or alternatively be applied to other video or media content such as surveillance, security, gaming, or other situations where it is desirable to be able to switch or change between different video or media content, or to present multiple different video or content without excessive delay or latency or viewing artifacts.

These features, aspects, and/or advantages provide significant solutions to the problems and limitations in the conventional arts. In arriving at these solutions, an engineering design approach was taken having the following engineering design and performance goals. These design goals are not to be interpreted as requirements or limitations of the invention or of any particular embodiments of the invention. Rather they were goals for the engineering design and these goals contributed at least in part to the inventive solution as revealed in the various embodiments.

First, a solution to the problem would advantageously require minimal or no intelligence or capability to be added to the client device, allowing any standard client device that might have been used with conventional digital video (such as Digital TV) to access the services of the inventive implementation with minimal or no change. Minimal change might for example require or be limited only to a software or firmware upgrade. Second, a solution to the problem would advantageously provide an algorithm or procedure that is "bounded"—that is where the load on the system implementing the problem solution needed to be no more than a constant multiple of the number of channels. Third, a solution to the problems and limitations of conventional systems and methods may advantageously provide a method and algorithm that has an upper bound on the configurable worst-case channel switch latency. Fourth, there was at least a recognition of a desirability that the solution not impose any overhead on the network, or at least not any uncontrolled overhead on the network, in terms of requiring higher uncontrolled data rates at the link connecting the user or client to the network. Fifth, it was desirable that any solution not to impose any restriction or at least no significant restriction, on the features available to the stream, such as an ability to use encryption or other security mechanism.

In recognition of these design goals, at least two embodiments of a solution are provided that use a slotted transmission technique that solves the problem. Embodiments or a multicast slotted transmission approach are described below.

FIG. 1 shows a non-limiting exemplary embodiment of an Internet Protocol television (IPTV) Network system 100. In one non-limiting embodiment, an encoder 102 for encoding digital TV or other program content is coupled to a network 104, such as for example to the Internet, and intranet, or to any other interconnected set of computers information appliances, or other devices as are known in the art or to be developed. The encoder communicates a content stream to the network so that it may be communicated to one or more destinations. A router, such as an edge router 106, is also coupled with the network 104, and configured to receive the encoded content. More than one router or edge router may be configured to receive the encoded content. A Digital Subscriber Line Access Multiplexer (DSLAM) 110 or equivalent device or system incorporating the function of a DSLAM receives the single multicast data stream 108 from the edge router 106. The DSLAM or equivalent device or system which is located relatively close to the digital TV or other content subscriber and client receiver device, such as a TV or content display set top box, communicates the content to the subscriber receiver device, such as the set top box or other device 112.

It is known in the art that a DSLAM (Digital Subscriber Line Access Multiplexer) is typically a network device, usually at a telephone company (Telco) central office, that receives signals such as a data stream from multiple customer Digital Subscriber Line (DSL) connections and puts the signals on a high-speed backbone line using multiplexing techniques, and performs the reverse operations for signal transmission from the backbone to the subscriber end user. Depending on the product, DSLAM multiplexers connect DSL lines with some combination of asynchronous transfer mode (ATM), frame relay, or Internet Protocol networks. The use of DSLAM enables a telephone company or other data provider to offer business or homes users relatively fast phone line based technology (DSL) with the fast backbone network technology (ATM).

Figure 2:
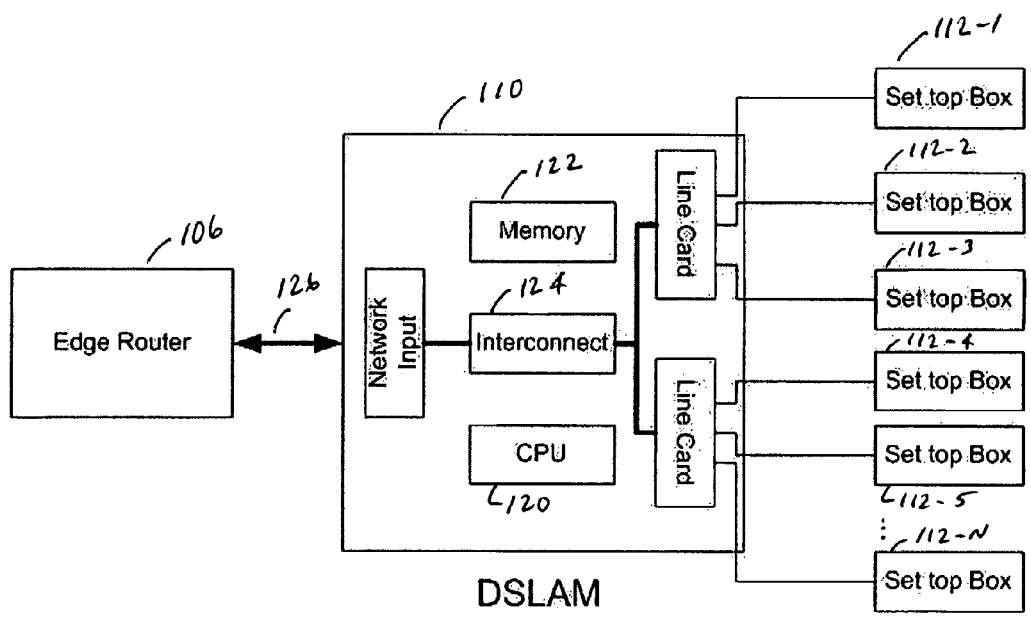
FIG. 2 is a diagrammatic illustration showing aspects of an embodiment of a Digital Subscriber Line Access Multiplexer (DSLAM) interconnection network according to an embodiment of the invention.

FIG. 2 is an illustration showing a downstream portion of the IPTV or other content distribution system of FIG. 1, including additional detail of the DSLAM or equivalent device, system, or component. DSLAM 110 receives a multicast media content stream from edge router 106 as a network input to a network input of the DSLAM. The network input may be some type of network interface card (NIC) or equivalent as may be known in the art. DSLAM 110 also provides interconnect circuitry or logic coupled between the network input and a plurality of line transmission circuits, typically in the form of line cards that are used to communicate the encoded content received from the edge router to a plurality of content destinations, such as to a plurality of subscriber receiver devices, such as to a diverse plurality of subscriber devices in subscriber homes, businesses, or the like destination locations. The communication between the DSLAM, and an output of the line card, is essentially a point-to-point connection to the subscriber destination as is known in the art.

DSLAM may also include some form of processing logic 120, such as a processor, central processing unit, ASIC, or other logic. The processing logic may include internal random access memory and/or be coupled to separate memory 122. Additional non-volatile memory (not shown) for storing programs, parameters, or other data or information may optionally be provided. Some conventional features of DSLAMs as are known in the art are not shown to avoid obscuring aspects of the invention.

Non-limiting embodiments of the invention provide control and switching logic to modify or control the operation of the DSLAM interconnect unit 124 so that the signals received by the interconnect from the network input are modified in accordance with the methods, procedures, and/or algorithms of embodiments of the present invention. As described elsewhere herein, non-limiting embodiments of the invention generate a plurality of multicast signals or data streams from a single multicast signal or data stream, each having a predetermined time shift or delay relative to the original received multicast signal 126. This plurality of derived multicast signals or data streams are communicated to each subscriber device that is entitled to receive it so that in the event that the subscriber chooses to change channel, the original version as well as the plurality of derived delayed versions of each channel is available for nearly instantaneous and viewing artifact-free or substantially artifact-free switching. The method, procedure, algorithm, and selection and decision criteria as to which of the plurality of multicast channels to select are described elsewhere herein.

It may also be appreciated in light of the description provided here, that although a wired network serves as a primary basis for description of the inventive system and method, that the inventive system and method may also or alternatively be applied to wireless communication systems and networks. For example, a wireless transmission tower or other wireless communication system as are known in the art, may serve the functionality of the DSLAM and may therefore be considered an equivalent of the DSLAM. This may include cellular telephone type wireless systems and towers, WI-FI type wireless systems and antennas, WI-MAX type systems and methods, or the like. Such a wireless transmission tower or communication system may for example provide wireless point-to-point communication links to a plurality of wireless stationary or mobile subscriber devices. Subscriber devices may for example include, but not be limited to, cellular or wireless telephones, computers, personal data assistants (PDAs), wireless set top boxes or receivers, and/or any other device or information appliance capable of receiving such wireless transmission. A subscriber may utilize their device to select and switch to a different channel in a manner similar to that described for a wired system.

For each video feed (also referred to as channel), at specified interval, a new multicast group is created. The data for the multicast group starts with the previous Random Access Point (RAP) so that the client can join the multicast instantaneously. The interval for creating a new multicast group can be configured. The interval may be configured based on the required maximum channel switching delay. While non-limiting embodiments of the invention are described relative to the use of Random Access Point (RAP) as one type of stand-alone frame described above, it may be appreciated that other non-limiting embodiments of the invention may use different types of stand-alone frames as alternatives to the RAP. These alternatives are not specifically described in detail to avoid obscuring features of the invention.

In an exemplary implementation of the slotted transmission approach, for each video feed (also referred as channel), at specified intervals, a new multicast group is created. The data for the multicast group starts with the previous Random Access Point (RAP) so that the client may join the multicast instantaneously (or substantially instantaneously). The interval for creating a new multicast group may be configured. In one non-limiting embodiment, the interval may be configured based on the required maximum channel switching time or delay permitted.

For example, if the interval for creating a new multicast group is configured at 500 msec, then a new multicast group may be created every 500 msec for a given channel. When a client, needs to join a specific channel, it determines and selects the optimal multicast group to join to have the best channel change experience, which may usually be the one with the smallest delay. Once, the client determines the multicast group to join, the client issues a command to join the multicast group, such as for example using the standard IGMP-join command. The client will start receiving data from the nearest RAP that has just passed and will be able to start decoding the video (or other media content) data almost immediately (for example, in the above example the maximum delay would be 500 msec plus the time taken by the IGMP-leave and IGMP-join command).

In this approach, since a new multicast group is created every 500 msec (with the 500 ms configuration or at other interval if a different configuration is chosen or implemented), the number of multicast groups for a given channel that may be implemented or provided may be unbounded, that is any number may be provided without an upper limit. However, a simple optimization may be used to limit the number of multicast groups. For example, if the interval between two RAPs is 5 seconds, the data on a multicast group that is just created and the data on the multicast group created 5 seconds earlier will be identical. Thus it is possible to merge the two multicast groups and use a single multicast group for both multicast groups. This limits the number of multicast groups that will need to be created to 5 seconds divided by 500 msec, or 10 multicast groups. Of course these numerical examples are merely exemplary, and the invention and scheme are not restricted to these particular numerical configurations or values.

In order to provide suitable multicast group starting with a RAP within a specified latency to the client, the server advantageously buffers the data stream. Typical buffering size requirements are advantageously more than the worst-case distance between two RAPs. In order to know the RAPs in the stream, the data is analyzed to generate suitable metadata.

In this implementation, for each channel, the server may maintain the following metadata about the buffered data.

PSI—Program Specific Information (such as for example PAT (Program Access Table) and/or PMT (Program Map Table)

PCR—Program Clock Reference

SPS—Sequence Parameter Set (or sequence header or equivalent of a video sequence header in MPEG-2 video).

RAP—Random Access Point (or other key frame, or stand-alone frame, for example an IDR or I-frame)

These PSI, PAT, PMT, SPS, RAP may be as provided for in the MPEG2 standard ISO/IEC 1381-7, which specification is hereby incorporated by reference. Program specific information may include a program access table (PAT), a program map table (PMT), a program information that identifies program properties and its composition like elementary streams, their properties and identification in the stream, and the like. Alternatively, analogous and/or equivalent metadata or other characterizing and/or defining information, parameters, or data may be utilized as standards change and evolve, or when different standards are utilized.

Figure 3:
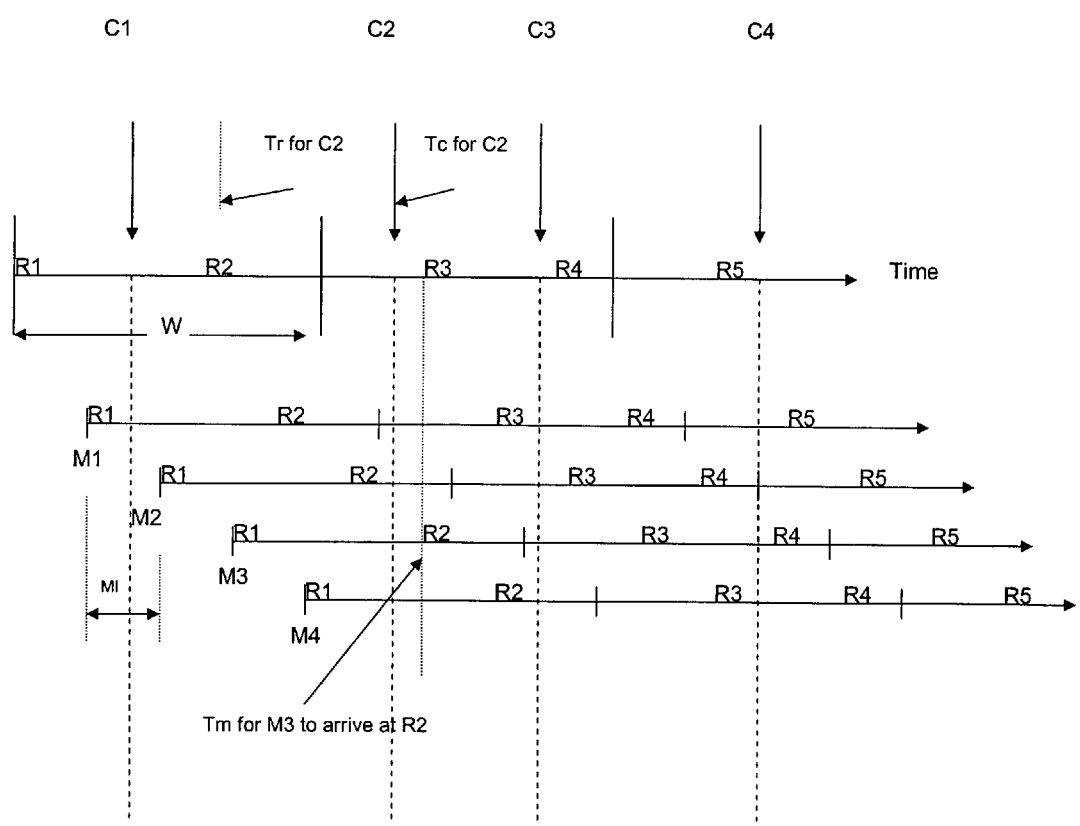
FIG. 3 is a diagrammatic illustration showing aspects of an embodiment of a Multicast Group Selection Algorithm according to the invention.

FIG. 3 illustrates an exemplary diagrammatic depiction of an exemplary embodiment of a multicast group selection algorithm of the multicast slotted transmission approach. The FIG. 3 diagram shows the worst-case distance as the worst case distance between two random access points (RAP) or distance W. The FIG. 3 diagram shows four multicast channels in this window. It shows four different clients joining the channel at different times. The multicast group chosen for each of the client is the one with the least latency possible. Other abbreviations appearing in the FIG. 3 diagram and used in the subsequent description are as follows:

MI—Multicast group creation interval

W—Worst case distance between two random access points

Mn—Multicast Groups created for the channel (W/MI)

$M_1$—A particular one of the n multicasts is selected from the Mn multicasts

Rn—Random Access Points

Cn—Clients joining the channel

Tc—Time when client request to join the channel is received

Tr—Time of the immediate previous RAP when a client attempts to join the channel Tm—Time in future, for a multicast group to arrive at a RAP represented by Tr in the channel data Tmjd—Multicast Joining Delay for a client (e.g., IGMP join latency)

In one non-limiting embodiment, certain goals for choosing the multicast group for a specific client are as described below. These are goals and not limitations of any particular embodiments of the invention. First (1), the particular one of the Multicast (for example, the $i^{th}$ one or $M_i$ of the $M_n$ multicasts) should advantageously arrive at the previous nearest RAP with respect to the client (occurrence at time Tr) at a time in the future (Tm). Second (2), the arrival delay (Tm-Tc) at the nearest RAP for Mn should advantageously be greater than Tmjd. Third (3), the arrival delay should advantageously be less than the duartion of MI+Tmjd.

The multicast group chosen for the clients shown in the diagram of FIG. 3 are as described below. This example arbitrary uses W/MI=4 as an example, thus there are four multicast groups $M_i=M_1-M_4$. There are also four clients $C_1$, $C_2$, $C_3$, and $C_4$, who try to join to the channel at different times. Based on non-limiting embodiments of the inventive approach, client $C_1$ and $C_4$ will join multicast group $M_1$. Client $C_3$ will join multicast group $M_2$ and client $C_4$ will join multicast group $M_3$. Note that embodiments of the invention are not limited to any particular number of additional delayed multicast groups, and embodiments having 2, 3, 4, 5, 6, 7, 8, 9, 10, 11, 12, 13, 14, 15, 16, 24, 48, 100, or more or any intermediate number of groups may be provided.

Therefore, using square brackets as a notation to identify client members of particular multicast groups:

$M_1=[C_1, C_4]$, $M_2=[C_3]$, and $M_3=[C_2]$.

If client $C_2$ were to join at an earlier time than depicted in the diagram such that, for example:

(Tm for $M_3$–Tc for $C_2$)<Tmjd, then, $M_3$ is no longer a suitable multicast group for $C_2$. In this case, the best candidate for $C_2$ is $M_4$.

It may be appreciated that embodiments of the inventive system and method provide or attempt to provide an optimum assignment or association of a client with a multicast group. In some instances a less than optimum assignment or association may be made. Even in these situations, the inventive approach offers advantages over conventional systems and methods.

If the third design goal (that the arrival delay should be less than the duartion of MI+Tmjd) is relaxed, a number or plurality of multicast groups can satisfy the first two design goals even if they are considered as design constraints. All of these possible plurality of multicast groups that satisfy the first two design goals or constraints may be sent or returned to the client in the increasing order of joining latency and client may choose the best one (or even an arbitrary one) depending on the network conditions or according some other policies or predetermined or dynamically determined selection criteria.

An exemplary embodiment of a method, procedure, and algorithm for fast channel switching is now described in additional detail. This algorithm is applicable to casts (or broadcasts) or other distributions of content of various types including to the multicast described herein. It will be appreciated that this algorithm may be implemented as a set of executable instructions in a computer program for execution in processing logic and optionally with processor coupled memory. For example, this computer program may be implemented in the DSLAM described elsewhere herein, or in an appliance providing analogous functionality to that of a DSLAM including for example a server, a network switch or router or other network device, that at least in part provides such functionality.

Having described several alternative approaches of the multicast slotted transmission technique, including some optional but advantageously adopted design goals, some required conditions, and some optional features and constraints, attention is now directed to the description of an embodiment of process or method for implementing a slotted multicast approach for a fast channel change or switch as well as some buffer size considerations.

Embodiments of this process or method may be implemented as hardware, as software/firmware, or as a combination of software/firmware and hardware. When software/firmware or other computer program code is included in an implementation, the software/firmware may include instructions and optional data or parameters for execution in a processor logic (such as for example in a micro-processor, central processing unit (CPU), multi-core processor, or any other processing logic) coupled with an internal or external memory. Exemplary non-limiting embodiments of the invention also contemplates a computer program and computer program product implementation of the procedures and methods described herein either separately or combined. The computer program may be stored in an electronic form and/or on a computer readable medium. For example, separate computer programs may be provided for server of server side, middleware, and client or client side operations or procedures. Computer programs may be stored on a tangible media for reading and execution by a processor or processing logic in a computer or other information appliance or device as described.

In the exemplary process, method, or computer program for implementing a slotted multicast for a fast channel change or switch, it may be noted that in the following steps, RAP refers to a RAP which advantageously has or includes some meta-information or meta-data such as for example PSI, PCR and other information before the RAP.

It may also be appreciated that a. Random Access Point or RAP is one particular type of stand-alone or key frame from which the data frame may be decoded without reference to past or future (other) frames. Other stand-alone frames (SAFS) in current standards include but are not limited to the Random Access Point (RAP), key frames, IDR frame, and an I-frame. The invention contemplates the use of any of these frames and further contemplates other or different stand-alone frames types that may arise in the future. In some instances the term and acronym stand-alone frame of SAF is used, however, as random access point (RAP) type frames or data items are one of the more common stand-alone frame types, the embodiments of the invention have principally been described with this stand-alone frame type in mind and using the RAP nomenclature. It will be appreciated by those having ordinary skill in the art in light of the description provided here that other stand-alone frame types may be used, and that the RAP, nRAP, and associated language is a stand in for and means any of these stand-alone frame or data types.

Therefore it will be appreciated that in one non-limiting embodiment, the invention provides a method of changing a data stream from a first data stream to a second data stream, the first data stream being received on a first channel and the second data stream being received on a second channel, the method comprising the steps on the receipt of each channel change request, of: (1) determining the multicast it needs to join to experience the best latency for channel change, and generating a Join request which is sent to a channel server; (2) for the new join request received from the channel server, querying a buffer list storing metadata related to the data stream; (3) determining the nearest existing multicast group (referred as nMG) for the channel that satisfies or comes the closest to satisfying predetermined goals or conditions; (4) receiving the identity of the nearest existing multicast group (nMG); and (5) the client joining the nearest existing multicast group (nMG).

This method may be further defined to require that one of the server and the client determine the nearest existing multicast group. Alternatively it may require that the server determines the nearest existing multicast group. Alternatively it may require that the client determines the nearest existing multicast group.

The method may be further defined to require that the client determining the multicast it needs to join further comprises: (1)(i) providing, by the server, a client with information that permits identification of one particular data stream having a certain program content and timing from a plurality of data streams having the same certain program content but different timings, the different timings representing time delays relative to other of the data streams; (1)(ii) generating a client-side request to view a particular data stream; (1)(iii) performing a calculation to identify the one particular data stream having a certain program content and timing from the plurality of data streams having the same certain program content but different timings; and (1)(iv) generating a request to receive the identified one particular data stream and communicating the request to the source of the identified one particular data stream.

In one non-limiting embodiment, the method above may provide that the step of (1)(ii) generating a client-side request to view a particular data stream comprises generating a request to view comprises a generating a request to view comprises a request to change or switch from a first current data stream to a second different data stream, media feed, media channel, media stream, video feed, or video channel. It may alternatively or in addition provide that the step of (1)(iv) generating a request to receive, comprises a request to join and optionally a request to leave a previous selection. In one non-limiting embodiment, the source may comprises a channel server of the identified one particular data stream.

In one non-limiting embodiment, the above method may provide that the step of the client, for the new join request received from the server, querying a buffer list storing metadata related to the data stream, further comprises: (i) determining the temporally nearest stand alone frame (SAF) in the buffer list (referred to as nSAF); (ii) determining the nearest previous program clock reference or equivalent (PCR) in the buffer list with respect to the nSAF (referred as nPCR); (iii) determining the nearest previous sequence information (PSI); and (iv) determining the nearest previous program specific information (PSI) in the buffer list from either nPCR or nSPS whichever has greater distance with respect to the nRAP (referred as nPSI).

In one non-limiting embodiment, the previous sequence information may comprise a sequence parameter set (SPS), or sequence header (SH), or video sequence header, or other information that identifies the video properties with respect to the nSAF (referred as nSPS).

In one non-limiting embodiment, the method may further require that the predetermined timing conditions or constraints comprise a constraint that the nearest existing multicast group (referred as nMG) for the channel that satisfies constraints that: (3)(i) contains a nearest previous program specific information (nPSI) at time greater than the time (Tc) at which a client request to join the channel is received plus the multicast join delay time for a client (Tmjd) or Tc+Tmjd; and (3)(ii) arrives at the nearest previous program specific information (nPSI) at a time in the future (Tm) for a multicast group to arrive at a stand-alone frame (SAF) represented by a time (Tr) of the immediate previous stand-alone frame SAF when a client attempts to join the channel represented by Tr in the channel data such that, the time in future Tm for a multicast group to arrive at a stand-alone frame (e.g. RAP) represented by Tr in the channel data is greater than a time Tc when the client request to join the channel is received and greater than or equal to the sum of (i) the time Tc when client request to join the channel is received plus the Multicast Joining Delay time Tmjd for a client plus the Multicast group creation interval or (Tc+Tmjd+MI)>=Tm>Tc).

Recall that the stand-alone frame (SAF) according to the method may be any type of stand-alone frame or data items, and may for example by way of example but not limitation be a Random Access Point (RAP), a key frame, an IDR frame, and an I-frame, any other frame or data items that can be decoded to completely reconstruct the frame with reference to other frames, and any combination of these.

Recapitulating these steps for a Random Access Point or RAP specific perspective, in a non-limiting embodiment of the invention, the following procedure is performed.

First (1), a client (i) determines the multicast it needs to join to experience the best latency for channel change, and (ii) generates a channel join request which is sent to a channel server.

Second (2), for the new join request received from the client, a server such as a server adapted to serve data or content to the channel (referred to as a channel server) performs the following operations or steps:
  (i) The server finds out or determines the nearest RAP in the buffer list (referred as nRAP).
  (ii) The server finds out or determines the nearest previous PCR in the buffer list with respect to the nRAP (referred as nPCR).
  (iii) The server finds out or determines the nearest previous SPS in the buffer list with respect to the nRAP (referred as nSPS).
  (iv) The server finds out or determines the nearest previous PSI in the buffer list from either nPCR or nSPS whichever has greater distance with respect to the nRAP (referred as nPSI).

Third (3), determine the nearest existing multicast group (referred as nMG) for the channel that advantageously satisfies the following design goals:
  (i) Contains an nPSI at time greater than now (Tc)+multicast join delay (referred as Tmjd).
  (ii) Arrives at the nPSI at a time in future (Tm) such than, Tm>Tc and Tm<=(Tc+Tmjd+MI), where Tc is the time when the client request to join is received.

Fourth (4), returns the found multicast group (with the smallest Tm) to the client or a list of multicast groups.

Fifth (5), the client joins the MG returned by the channel server.

It may be appreciated in light of the description provided here, that the program specific information (PSI), may only contain meta data about the program or content itself and does not contain (or need to contain) any time information. There is no modification or need to modify the original data in this inventive approach. The time referred to relative to PSI is the time of the occurrence of nearest PSI (nPSI, or the most recently observed PSI) in the original channel multicast. The system and method create several time-shifted multicasts using the original channel. Due to the occurrence of the nearest PSI (nPSI), the original channel will be delayed by a time equal to the time-shift with respect to the original channel in all the plurality of generated multi-cast channels. The system and method may then choose one of these multicast channels, such that nPSI should occur at a future time, and also satisfy additional constraints or goals, such as for example the multicast join delay time (Tmjd).

As stated in the first (1), the client determines which multicast group to choose. There are several possible schemes for making this multicast channel Join choice or selection, which the client can use to determine the optimal multicast group to join. One scheme, and perhaps the simplest scheme, is one where the client sends a request to the server to determine the next multicast group that is starting and join that multicast group.

Figure 4:
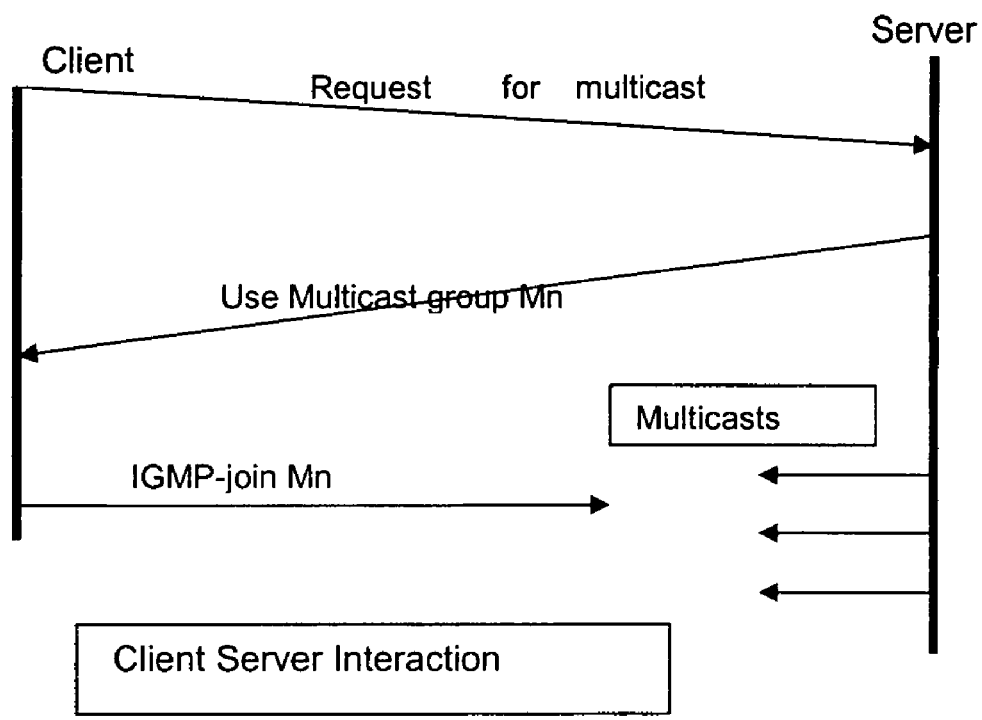
FIG. 4 is a diagrammatic illustration showing the typical interactions between a client and server according to the invention.

FIG. 4, illustrates the client and server interaction for one particular embodiment using this simple approach where the client sends a request to the server to determine the next multicast group that is starting and join that multicast group. Alternatively, the client and server can synchronize up to a common time reference or other reference, which would allow the client to automatically compute the multicast channel it should or needs to join for the best viewing experience. Other schemes for making this choice or selection may alternatively be used.

It may be appreciated in light of the description provided herein that embodiments of the invention provide useful and distinct advantages over conventional systems and methods. In one exemplary embodiment, the solution may include the following salient features, some of which may be optional in particular embodiments or implementations:
  Each channel change request will experience a maximum latency of (L), which is determined by the configuration parameters.
  For each channel, at most (M) multicast groups can exist, which is determined by the configuration parameters.
  On channel change, the client joins a multicast group with a nearest RAP in the channel's data stream.
  For each channel the size of the buffer (B) is bounded and can be determined from the configuration parameters.
  The computational complexity for each channel is bounded and can be determined based on the configuration parameters.

The slotted multicast transmission scheme involves data or content provider side aspects, such as may be performed by server and DLSAM or DSLAM-like logic as well as client side aspects such as the a set top box or other client or subscriber device.

Client side aspects of the slotted multicast transmission scheme may readily be implemented with minimal logic or procedure on the client. For example, all that may be needed on the client is a channel lookup request followed by the multicast join command, and if appropriate a multicast leave from any prior program or content.

This approach requires no interpretation of the video stream data and hence can be used with other features such as encryption.

The following parameters or values may be selected to configure the server, such as a video sServer in order to achieve efficient channel switching experience.

TABLE 1

Parameters for Buffering Requirements Determination

| Parameter | Description |
|---|---|
| dRAP | Maximum duration between successive Random Access Points |
| dSPS | Maximum duration between successive Sequence Parameter Sets |
| dPCR | Maximum duration between successive Program Clock References packets |
| dPSI | Maximum duration between successive Program Specific Information tables |
| MI | Multicast group interval - based on the maximum channel switch latency required to achieve. |
| $W_{min}$ | Maximum duration of data to be buffered on the server (minimum) |
| Sf | Optional Safety Factor (probably in the range of 1.05 to 1.3 to have 5% to 30% margin, with Sf = 1.2 to get a 20% margin) |
| W | Maximum duration of data to be buffered on the server (minimum with safety factor applied) |
| Tmjd | Maximum delay to join a multicast (that may also depend on the network and client's operating system) |

The parameters in Table 1 appear in the expressions for buffering required, number of multicast groups per channel, and/or maximum channel change latency below:

The minimum buffering duration or time required $W_{min}$ in seconds is given by the expression:

$$W_{min} \text{ (in seconds)} = dRAP + dSPS + dPCR + dPSI$$

where $W_{min}$ represents the minimum value of the maximum duration or time in seconds for which we need to buffer the data on the server. In the event that an optional safety factor is desired, so that buffer filling or overflow may more readily be avoided or prevented, this buffer duration with a safety factor is given by the expression:

$$W \text{ (in seconds)} = Sf \times (dRAP + dSPS + dPCR + dPSI),$$

where safety factor (Sf) may typically be a number in the range from 1.0 to 2.0 or even greater though it is advantageous to only provide sufficient buffering to handle expected conditions. In one embodiment, Sf=1.05 to provide a 5% buffer margin, in another embodiment Sf=1.10 to provide a 10% buffer margin, in still another embodiment Sf=1.15 to provide a 15% buffer margin, in yet another embodiment Sf=1.20 to provide a 20% buffer margin. It will be appreciated that $W_{min}$ is equal to W when Sf=1. Other lower, higher, or intermediate valued safety factors may be chosen and applied. A safety factor if used may be predetermined or dynamically determined during operation. It may be appreciated that the particular margin if any may be chosen as part of a system optimization or tuning, and that the optimum value may depend on various factors, possibly including system and network related factors, content related factors, minimum quality of service factors, or the like.

The actual size or capacity of the buffer or buffering (in bytes) that correspond to the buffering duration measured as time will depend on the bitrate of individual data streams. For example, for a data stream having a bit-rate of R bits/second will have a buffer size requirement of $$W_{Bytes} \text{ (in bytes)} = (R/8) \times Sf \times (dRAP + dSPS + dPCR + dPSI), \text{ or}$$

$$W_{Bytes} \text{ (in bytes)} = (R/8) \times W \text{ (in seconds)}.$$

The number of multicast groups per channel (NMG) is given by the buffer size in seconds divided by the multicast group interval as indicated in the expression below:

$$NMG = W/MI$$

where W is the maximum duration of data to be buffered on the server, and MI is the multicast group interval. Recall that the multicast group interval is the time shift between two consecutive multicasts and may be selected according to the maximum channel switch latency that is required to be achieved.

Finally, the Maximum channel change latency (L) for the slotted multicast transmission scheme approach is given by the additive sum or the multicast group interval and the maximum delay time to join a multicast as given by the expression immediately below:

$$L = MI + Tmjd,$$

where again MI is the multicast group interval, and Tmjd is the maximum delay to join a multicast.

In at least one non-limiting embodiment, once the subscriber selects a particular channel (or selected particular video stream) and the client devices selects and joins a particular one of the plurality of available multicast data streams the client continues to receive and view the selected particular one of the plurality of available multicast data streams until the client (or subscriber) changes channel or requests a different media stream (or stops viewing entirely).

In at least one non-limiting embodiment, the selected particular one of the plurality of available multicast data streams is a data stream having a temporal offset or non-zero delay relative to the input data stream.

Figure 5:
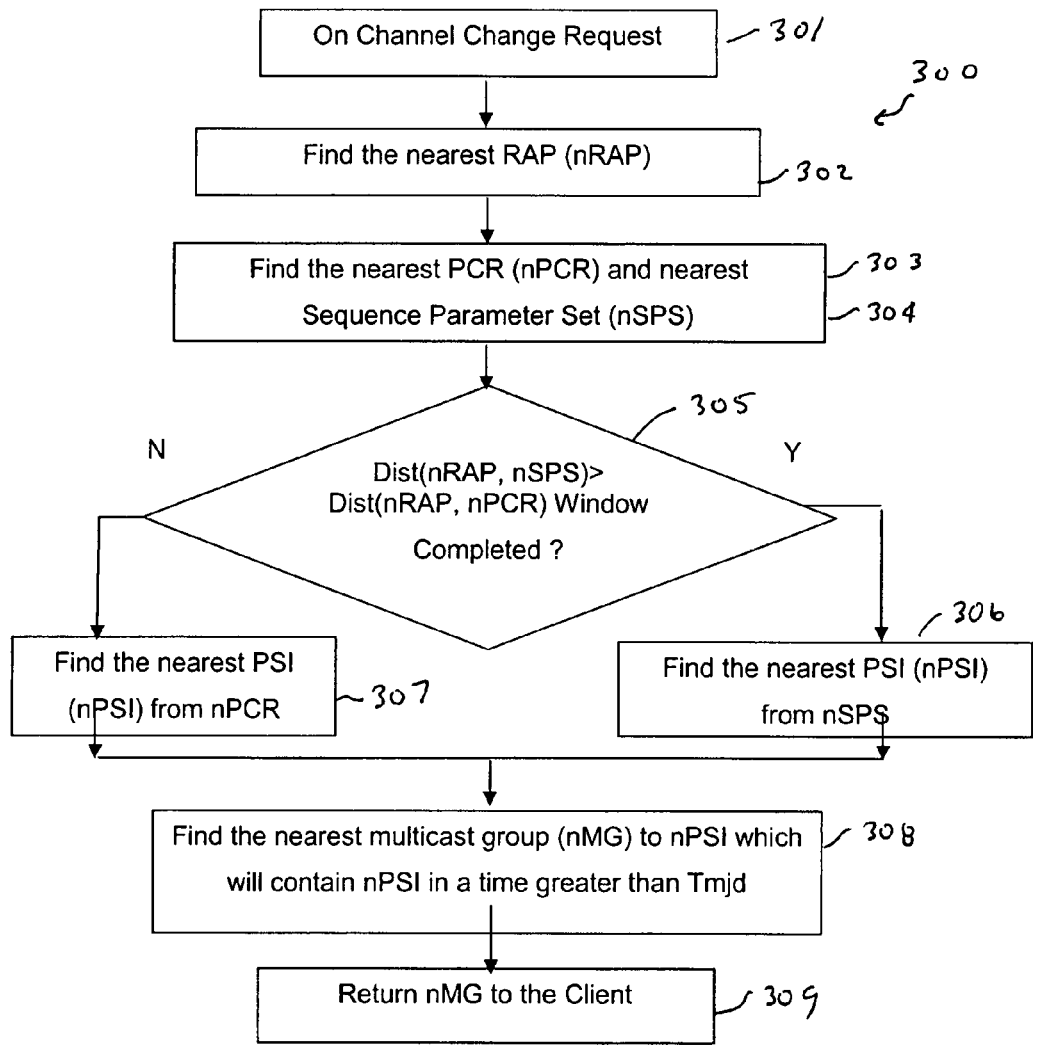
FIG. 5 is a diagrammatic illustration showing a flow chart of the procedure followed on a channel change request according to an embodiment of the invention.

With reference to the flow chart diagram for an exemplary embodiment of the invention in FIG. 5, this approach may be restated as follows. First, On Channel Change Request (Step 301) the server finds the nearest RAP (nRAP) (Step 302). Next, the server finds the nearest PCR (nPCR) (Step 303) and the nearest Sequence Parameter Set (nSPS) (Step 304). A determination is then made as to whether Dist(nRAP, nSPS)>Dist(nRAP, nPCR) (Step 305). If this expression is valid or true (yes), then server finds the nearest PSI (nPSI) from nSPS (Step 306). If this expression is not valid or false (no), then server finds the nearest PSI (nPSI) from nPCR (Step 307). In either of these cases, server then finds the nearest multicast group (nMG) to nPSI which will contain nPSI in a time greater than Tmjd (Step 308). Finally, it returns nMG to the client (Step 309).

It will be appreciated by workers having ordinary skill in the art in light of the description provided here that although a focus for certain embodiments of the invention has been channel changing of digital television, IPTV, or the like, various embodiments of the invention may be applied to other and different types of streaming data generally, to streaming video or image data more particularly, and to video or sequential image data in various forms known today or to be developed in the future. These various forms might for example include streaming or sequential data from a plurality of different video camera feeds or sources, content or streaming data from different providers, and the like. Embodiments of the invention are applicable to each of these different data and signal types, and the channel changing or switching described herein apply to changing or switching between these and other streamed content as well.

Methods and procedures of the instant invention may be implemented as one or more computer programs including executable computer program instructions and optional data or parameters executing in a processing logic, such as a processor, microprocessor, controller, or the like. The processor may also advantageously be coupled to a memory or other storage, such as a random access memory, that interoperates with the processor during the processing operations. The invention also includes computer program product that stores the computer program in a computer readable or electronic form. In some embodiments the computer program product is stored on a CD or DVD disc. In some embodiments the computer program product is stored in electronic form for transmission.

Non-limiting embodiments of the invention further includes a video stream or plurality of video streams formed according to the inventive procedure described herein, and an article of manufacture including a digital television signal.

Non-limiting embodiments of the invention further includes servers and client side devices that interoperate to generate, transmit, and/or receive the signal streams and content described herein.

Non-limiting embodiments of the invention further provides method, system, computer program and computer program product for reducing switching delays between digital video feeds using slotted transmission techniques.

Non-limiting embodiments of the invention further provides a business method and model for efficient and artifact free insertion of customized content such as local or directed advertisements into a national video stream and for realizing increased monetary revenues as a result of such insertion.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A method of changing a data stream from a first data stream to a second data stream, the first data stream being received on a first channel and the second data stream being received on a second channel, the method comprising:
   (1) determining the multicast said data stream needs to join to experience the best latency for channel change, and generating a join request which is sent to a channel server;
   (2) for the new join request received by the channel server, querying a buffer list storing metadata related to the data stream; further comprising:
      (i) determining a temporally nearest stand alone frame (SAF) in the buffer list (referred to as nSAF);
      (ii) determining a nearest previous program clock reference or equivalent (PCR) in the buffer list with respect to the nSAF (referred as nPCR);
      (iii) determining a nearest previous sequence information (SI), or dependent-sequence parameter set (SPS), or sequence header (SH), or video sequence header, or other information that identifies the video properties with respect to the nSAF (referred as nSPS); and
      (iv) determining a nearest previous program specific information (nPSI) in the buffer list from either nPCR or nSPS whichever has greater distance with respect to the nearest Random Access Points (nRAP);
   (3) determining a nearest existing multicast group (nMG) for a channel that satisfies or comes the closest to satisfying predetermined goals or conditions;
   (4) receiving an identity of the nearest existing multicast group (nMG); and
   (5) a client joining the nearest existing multicast group (nMG).

2. A method as in claim 1, wherein a client determining the multicast it needs to join further comprising:
   (1)(i) providing, by the server, a client with information that permits identification of one particular data stream having a certain program content and timing from a plurality of data streams having the same certain program content but different timings, the different timings representing time delays relative to other of the data streams;
   (1)(ii) generating a client-side request to view a particular data stream;
   (1)(iii) performing a calculation to identify the one particular data stream having a certain program content and timing from the plurality of data streams having the same certain program content but different timings; and
   (1)(iv) generating a request to receive the identified one particular data stream and communicating the request to a source of the identified one particular data stream.

3. A method as in claim 2, wherein the step of (1)(ii) generating a client-side request to view a particular data stream comprises a request to change or switch from a first current data stream to a second different data stream, media feed, media channel, media stream, video feed, or video channel.

4. A method as in claim 2, wherein the step of (1)(iv) generating a request to receive, comprises a request to join and optionally a request to leave a previous selection.

5. A method as in claim 4, wherein the source comprises a channel server of the identified one particular data stream.

6. A method as in claim 4, wherein the step of (1)(iv) includes processing and/or displaying the data stream until the next channel change, or stops viewing the channel once the client joins the chosen one of the plurality of the data streams.

7. A method as in claim 4, further comprising step (1)(v) continuing to receive data from the one particular data stream until stop viewing or next channel change.

8. A method as in claim 2, wherein in the step of (1)(i) each of the streams in the plurality of the data streams are identical with respect to the original channel data stream and each of the plurality of streams requires the same network bandwidth requirement with respect to the original channel data stream.

9. A method as in claim 1, wherein the predetermined goals or conditions comprise a constraint that the nearest existing multicast group (nMG) for the channel that satisfies constraints that:
   (3)(i) contains a nearest previous program specific information (nPSI) at time greater than the time (Tc) at which a client request to join the channel is received plus the multicast join delay time (Tmjd) for the client, identified as (Tc+Tmjd);
   (3)(ii) arrives at the nearest previous program specific information (nPSI) at a time in the future (Tm) for a multicast group to arrive at a stand-alone frame (SAF) represented by a time (Tr) of the immediate previous stand-alone frame SAF when the client attempts to join the channel represented by Tr in the channel data such that, the time in future Tm for a multicast group to arrive at a stand-alone frame represented by Tr in the channel data is greater than a time Tc when the client request to join the channel is received and greater than or equal to the sum of (i) the time Tc when client request to join the channel is received plus the multicast joining delay time (Tmjd) for a client plus the Multicast group creation interval or (Tc+Tmj d+MI)>=Tm>Tc).

10. A method as in claim 1, wherein the stand-alone frame (SAF) comprises one of a Random Access Point (RAP), a key frame, an IDR frame, and an I-frame.

11. A method for switching between a plurality of cast groups, the method comprising:
on identifying a channel change request, the server finding a nearest Random Access Points (nRAP), a nearest PCR (nPCR)) and a nearest sequence parameter set (nSPS);
determining whether Dist(nRAP, nSPS)>Dist(nRAP, nPCR);
if Dist(nRAP, nSPS)>Dist(nRAP, nPCR) is valid or true, then the server finding a nearest PSI (nPSI) from nSPS; and if Dist(nRAP, nSPS)>Dist(nRAP, nPCR) is not valid or false, then the server finding a nearest PSI (nPSI) from nPCR; and
the server then finding a nearest cast group (nMG) to nPSI which will contain nPSI in a time greater than a multicast join delay time (Tmjd) .

12. A method as in claim 11, wherein at least one of the plurality of cast groups comprises an advertisement.

13. A method as in claim 11, wherein at least one of the plurality of cast groups comprises a sports video stream or a movie.

14. A method as in claim 11, wherein the plurality of cast groups comprises a plurality of multicast groups.

15. A method as in claim 11, wherein the plurality of cast groups comprises a plurality of unicast groups.

* * * * *